Dec. 29, 1931.    A. M. BUSWELL    1,838,475
SEWAGE TREATMENT
Filed May 9, 1929
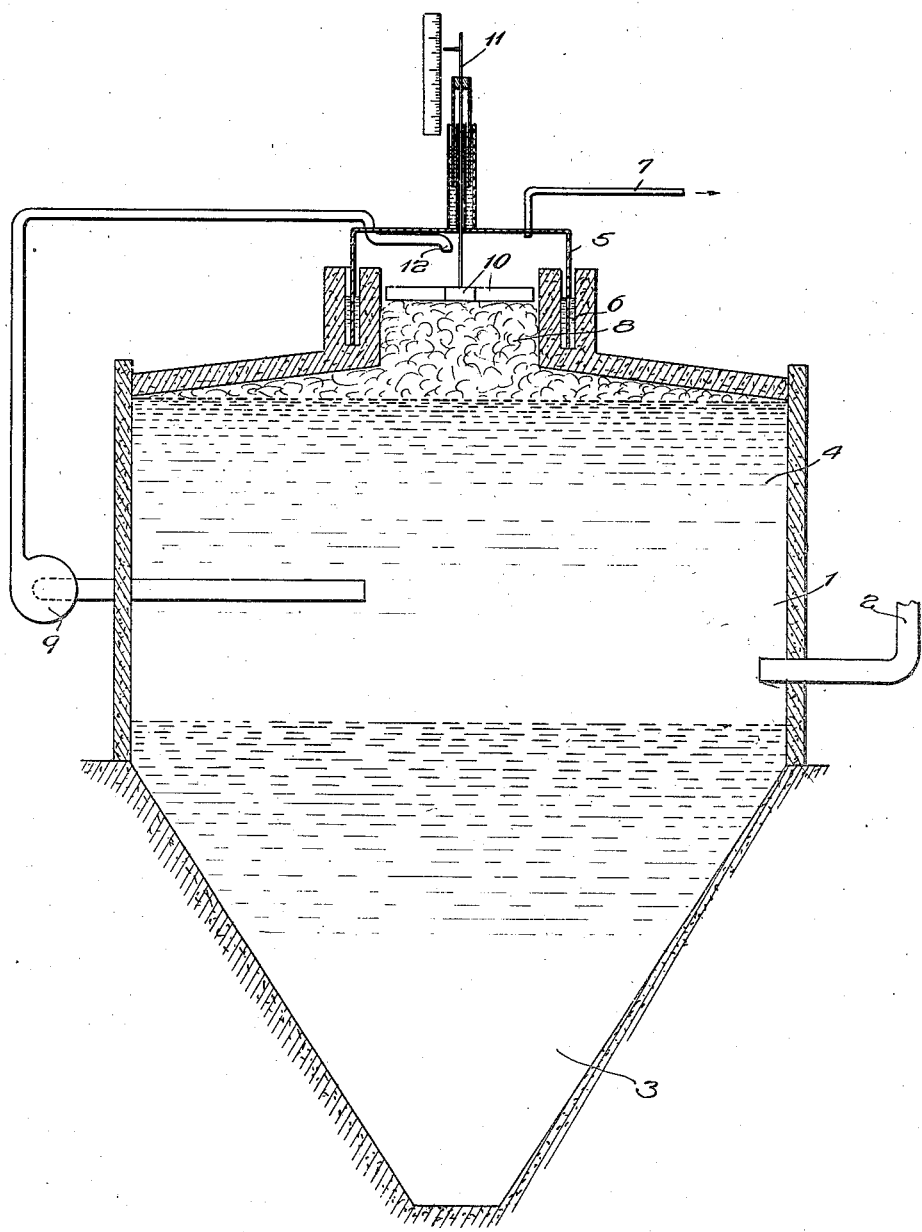
Witness:
William P. Kilroy
Inventor
Arthur M. Buswell
By Brown, Jackson, Boettcher & Dienner
Attys Patented Dec. 29, 1931

1,838,475

UNITED STATES PATENT OFFICE

ARTHUR M. BUSWELL, OF URBANA, ILLINOIS, ASSIGNOR TO BOARD OF TRUSTEES OF THE UNIVERSITY OF ILLINOIS, OF URBANA, ILLINOIS, A CORPORATION OF ILLINOIS

SEWAGE TREATMENT

Application filed May 9, 1929. Serial No. 361,602.

This invention relates to sewage treatment although it is not necessarily limited thereto, and it is one of the objects of the present invention to provide means for preventing the accumulation of scum or foam during bacteriological fermentation or digestion.

The usual method of digesting sludge is to allow it to remain in a tank for three or four months during which time the material is decomposed by bacteriological and chemical action. The solid matter settles to the bottom of the tank from which it can be removed and dried, and the liquid in the tank undergoes decomposition to such an extent that it becomes inoffensive and may be readily disposed of.

During the first few days of decomposition an appreciable amount of gas having a high calorific value is generated. This gas may be collected and sold. During the early stages of decomposition a difficulty is generally encountered due to the accumulation of scum. It may be noted that in one experiment the scum reached a thickness of twenty-six inches in about a month. It had a moisture content of 80% and was so stiff that a shovel was forced into it with difficulty. Liquor expressed from the scum had a pH of 5. This scum slows down the decomposition process and is objectionable in many other respects.

It is an object of the present invention to provide means for preventing the accumulation of scum in digestion tanks. Since the scum formed is practically a gel I have found that the liquor from which it is separated could be used to soften it. I pump the liquor from beneath the scum upward and allow it to flow on to the scum in a gentle stream or spray. I have found that all violent jet or spray action should be avoided since such action results in extensive foam formation. I have found that where the scum has been permitted to accumulate, a ten day circulation at the rate of ten gallons per minute completely disintegrated a 26 inch layer of stiff scum and allowed gases evolved during digestion to escape smoothly into the gas collector. After the scum has once been softened and disintegrated it was found that circulation for from five to ten minutes a day prevented any further scum formation.

It sometimes happens that the fermentation of sewage sludge results in the formation of a froth or foam rather than scum. Foaming appears to be rather spasmodic and of variable intensity. When it occurs in tanks with restricted gas vent areas it may completely upset the operation of the plan. I have seen foam coming out of the vents of a tank like the froth out of a bottle of warm soda pop. In tanks equipped with gas collectors the foam will sometimes fill the gas dome, clog the delivery pipe and force its way out through the water seal running "all over everything".

The factors which bring about this condition during sludge digestion do not appear to be the same in all cases. The formation and stability of any foam depends upon the viscosity rather than upon the surface tension of the film. The rate or violence of foaming will depend on the rate of gas formation.

The liquid in the froth film is more concentrated than the liquor from which the foam is formed, and I have found that circulating the liquor as was done to break up the scum would likewise dilute and break the foam. As an experiment a vigorous foaming was produced in a tank under observation by raising the temperature to 37° C., thus greatly increasing the rate of gas formation. After a few hours the foam broke the gas seal and flowed over the top of the tank. The circulating pump was then started and within three minutes the foam level had subsided seven inches. Thereafter it was possible to control the foaming by starting the pump whenever the indicator showed that the level was rising.

Three to five minutes circulation at a time was sufficient to break the foam, and routine circulation for five to ten minutes per day was usually sufficient to prevent foam formation.

Lime treatment is usually effective in controlling foaming as well as in breaking up the scum, but in aggravated cases the quantity of lime required is high, amounting in one case to $100.00 worth per day. Dilution with water may also be effective in controlling foaming or scum formation but here again, in large installations, the cost of the water becomes an appreciable item.

My method control has the following features in its favor.

1. The total costs are not high since the pump lifts against a head of only two or three inches plus the friction in the pipe.
2. The installation costs should not be excessive since with proper connections one small motor and pump could be made to serve a large number of gas vents by pumping to one at a time.
3. The method is effective.

The attainment of the above and other objects of the present invention will be apparent from the following specification taken in conjunction with the accompanying drawing forming a part thereof.

The single figure of drawing is a diagrammatic section of a sludge digestion tank embodying the principles of my invention.

Sludge is introduced into the digestion tank 1 in any preferred manner, a conduit 2 being illustrated for this purpose. The sludge generally consists of about 95% water and 5% of fats, carbohydrates, proteins, and other sewage matter. This is a by far higher concentration than is present in free sewage, since ordinary sewage generally contains about 1/300 of 1% solid matter. This concentration is obtained by passing the sewage through a settling tank, or the like, in the customary manner, before sending it into the digestion tank. This is the usual procedure in sewage sludge digestion. In the tank the solid matter gradually settles to the bottom as indicated at 3, the material at 4 being mostly liquid. The sludge is permitted to remain in the tank 1 where it undergoes bacteriological and chemical decomposition to render it fit for disposition in a known manner. During the first few days of decomposition a considerable amount of gases having a high calorific value are liberated. The top of the tank is provided with a cover 5, suitably sealed as indicated at 6, thereby permitting the collection of the gases liberated. A pipe 7 extends from the cover 5 to a gas holder. The gases collected have a calorific value about 50% better than that of domestic gas and there is from 1 to 4 cubic feet of gas liberated per day, per capita. Considering the fact that the average amount of gas used is about 20 cubic feet per day, per capita, it may be seen that the amount of gas obtained may be of considerable value.

During the first four to eight days 50% of the solid matter comprising the sludge decomposes to form gases which escape through the pipe 7. New sludge is introduced through the inlet 2 and some of the liquid at the top of the tank is permitted to drain off. The partially decomposed matter at the bottom of the sludge tank may be removed and permitted to decompose still further in a different tank, as pointed out in the pending application of myself and Sidney L. Neave, filed of even date herewith, or the sludge may be left in the tank 1 for complete digestion in the usual manner. An outlet is provided for withdrawing the completely or partially decomposed material at the bottom of the tank.

As previously stated, a scum or foam tends to form upon the liquid 4. This scum or foam is indicated at 8. To prevent the accumulation of scum or foam to the extent indicated I provide a circulator in the form of a pump 9 which withdraws liquid from a level below that to which the scum or foam may extend and redeposits it at the top of the foam or scum. If desired, I may provide a device for distributing the returned liquid over the surface at the top of the tank. In the embodiment of my invention herein illustrated this distribution is accomplished by allowing the returned liquid to fall upon two boards 10 nailed in the form of a cross and floating on top of the liquid. This float is provided with a rod 11 extending outside of the tank cover 5 which rod serves as an indicator of the level of the surface in the tank.

The discharge pipe 12 is placed within a very short distance, two or three inches, from the member 10, thereby further avoiding violent jet or spray action.

The circulation of liquid as described will (A) soften and dissipate scum which may have accumulated at the top of the tank. (B) Will dilute and dissipate foam which may have accumulated at the top of the tank. (C) Will result in desolution of gases dissolved in the liquid at the level of the intake pipe, by reason of the fact that the pressure upon the liquid is reduced by raising it from a lower to a higher level, which change in pressure lessens the solubility of the dissolved gases. (D) Will disperse or comminute solid particle of colloidal or gel-like nature rendering them more susceptible to bacterial action. (E) Will prevent the development of local zones in which bacterial bi-products accumulate, and slow down or prevent bacterial action (as the occurrence of acid condition in thick scum). (F) Will allow the operation of a sludge digestion tank without preliminary feeding by or provision for the accumulation of digested sludge. (Current practice requires that 4 to 50 pounds of digested sludge be present in a tank for each pound of fresh sludge added daily.)

In compliance with the requirements of the patent statutes I have herein shown and described a preferred embodiment of my invention. It is, however, to be understood that the invention is not limited to the precise construction shown, the same being merely illustrative of the invention. What I consider new and desire to secure by Letters Patent is:

1. A digestion tank including a gas tight cover, means for collecting the gases generated during the digestion process, and means for circulating the liquid of the tank from a level below that to which the scum or foam may accumulate to the top of the scum or foam, thereby dissipating any scum or foam that may form.

2. In a digestion tank, means for circulating the liquid of the tank from a level below that to which the scum or foam may accumulate to the top of the scum or foam thereby dissipating any scum or foam that may form.

3. Sludge digestion means comprising a digestion chamber, a pump for circulating the liquid of the upper portion of the chamber for dissipating any scum or foam that may form, and means for collecting the gases generated in the chamber.

4. Sludge digestion means comprising a digestion chamber, a pump for circulating the liquid of the upper portion of the chamber for dissipating any scum or foam that may form, and means for distributing the circulation of the liquid at the surface of the scum or foam.

5. The method of preventing the accumulation of scum or foam during sludge digestion which comprises withdrawing some of the liquid from below the depth to which scum or foam may form and redepositing it upon the scum or foam formed.

6. The method of preventing the accumulation of scum or foam during sludge digestion which comprises dissipating the scum or foam by periodically depositing thereon liquid drawn from the digestion chamber at a level below the depth to which the scum has accumulated.

7. In a fermentation or digestion tank the method of preventing the formation of scum or foam during the decomposition process which comprises spraying the top of the liquid with some of the liquid from the tank.

8. The method of dissipating scum on top of liquid in a receptacle, which comprises withdrawing liquid from the receptacle at a level below that at which the scum forms and depositing it upon the scum.

9. In the digestion of organic matter, the method of operation which includes the step of withdrawing liquor from below the top surface of the digesting matter and depositing it on top thereof.

In witness whereof, I hereunto subscribe my name this 3rd day of May, A. D. 1929.

ARTHUR M. BUSWELL.